3,515,755
LOWER ALKANOYL AMIDO BENZOPHENONES

Leo Henryk Sternbach, Upper Montclair, and Arthur Stempel, Teaneck, N.J., assignors to Hoffmann-La Roche Inc., Nutley, N.J., a corporation of New Jersey
No Drawing. Application May 31, 1967, Ser. No. 642,357, now abandoned, which is a division of application Ser. No. 80,983, Jan. 6, 1961, now Patent No. 3,336,295, dated Aug. 15, 1967. Divided and this application June 18, 1968, Ser. No. 737,861
Claims priority, application Switzerland, Dec. 2, 1960, 13,489/60, 13,490/60, 13,491/60, 13,492/60, 13,493/60, 13,494/60, 13,495/60
Int. Cl. C07c 103/42
U.S. Cl. 260—562
8 Claims

ABSTRACT OF THE DISCLOSURE

Alkoxy- or hydroxy-substituted lower alkanoyl amido benzophenones which are intermediates in the production of alkoxy- or hydroxy-substituted 5-phenyl-1,4-benzodiazepines. The 5-phenyl-1,4-benzodiazepines are useful as sedatives, muscle relaxants, anticonvulsants and tranquilizers.

---

Cross reference to related applications

This application is a divisional application of our application Ser. No. 642,357, filed May 31, 1967, now abandoned, which is a divisional application of our application Ser. No. 80,983, filed Jan. 6, 1961, now U.S. Pat. 3,336,295, issued Aug. 15, 1967.

Detailed description of the invention

This invention relates to novel, therapeutically active compounds, as well as their intermediates and processes for mixing them. The therapeutically active compounds to which the invention relates are hydroxy- or alkoxy-substituted 5 - phenyl - 3H - 1,4 - benzodiazepin - 2(1H)-ones. More specifically, they conform to the following formula

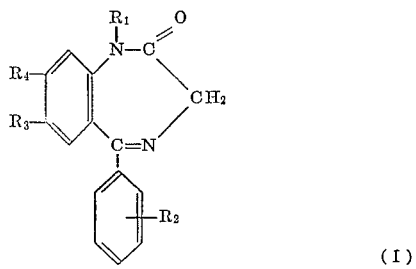

wherein $R_1$ is lower alkyl or hydrogen, $R_2$, $R_3$ and $R_4$ are hydroxy, lower alkoxy, halogen, lower alkyl or hydrogen, and at least one of $R_2$, $R_3$ or $R_4$ is lower alkoxy or hydroxy.

The term lower alkyl, as used in this disclosure, includes straight and branched chain alkyl groups such as methyl, ethyl, isopropyl, propyl and the like. The term lower alkoxy includes straight and branched chain alkoxy groups such as methoxy, ethoxy, propoxy, isopropoxy, and the like. The term halogen includes all four halogens, i.e., iodine, bromine, chlorine, and fluorine.

The products of the invention, conforming to Formula I above, form acid addition salts which are pharmaceutically acceptable, and such acid addition salts are included in the invention. The compounds of Formula I form acid addition salts with both organic and inorganic acids; for example, with organic acids such as formic, citric, succinic, maleic, toluenesulfonic, and the like, and with inorganic acids such as hydrohalic acids, e.g., hydrochloric, hydrobromic, and the like, and with other inorganic acids such as nitric, phosphoric, sulfuric, and the like.

The hydroxy- and/or alkoxy-substituted 5-phenyl-3H-1,4-benzodiazepin-2(1H)-ones and their acid addition salts are valuable therapeutics. These compounds, conforming to Formula I above, have utility as sedatives, muscle relaxants and anticonvulsants, and can be used as tranquilizers. They can be administered via conventional pharmaceutical forms, such as tablets, syrups, suspensions, capsules, and the like, and can be taken internally.

These compounds, conforming to Formula I above, can be produced by a variety of methods. For example, a nuclear hydroxy- or lower alkoxy-substituted 2-amino-benzophenone can be reacted with an α-halo-lower alkanoyl-halide to give a nuclear hydroxy- or lower alkoxy-substituted 2-(α-halo-lower alkanoyl-amido)-benzophenone, which can in turn be reacted with ammonia to give a nuclear hydroxy- or lower alkoxy-substituted 5-phenyl - 3H-1,4 - benzodiazepin - 2(1H) - one. Another route to the same compounds is to react a nuclear hydroxy- or alkoxy-substituted 2-aminobenzophenone with an α-aminoacid, for example glycine or an ester thereof. This reaction directly results in a hydroxy- or alkoxy-substituted 5-phenyl-3H-1,4-benzodiazepin - 2(1H) - one. Yet another method is to cyclize a hydroxy- or lower alkoxy-substituted 2 - (aminoacetamido) - benzophenone. This reaction can occur spontaneously or can be accelerated by heating.

The terms nuclear hydroxy- or lower alkoxy-substituted mean that the compound referred to has either a hydroxy or lower alkoxy substituent on either of its benzene rings.

The compounds corresponding to Formula I above wherein $R_1$ is hydrogen may be converted to corresponding compounds wherein $R_1$ is other than hydrogen by conventional alkylation methods. Such compounds, i.e., those corresponding to Formula I wherein $R_1$ is other than hydrogen, can also, of course, be produced from 2-(N-substituted amino)-benzophenones wherein the N-substituent is $R_1$.

The various intermediates, e.g., hydroxy- or alkoxy-substituted 2-amino-benzophenones, 2-(α-halo-lower alkanoylamido)-benzophenones, and the like, mentioned above are part of the invention. Some of the 2-amino-benzophenones utilized in the above-outlined processes can be made from novel 2-(lower alkanoylamido)-benzophenones by hydrolysis. These novel 2-(lower alkanoyl-amido)-benzophenones are also a part of the invention.

The following examples are illustrative of the processes and compounds of the invention. All temperatures are in degrees centigrade.

EXAMPLE 1

A solution of 16.5 g. (0.1 mol) of acet-m-anisidine and 17.5 g. (0.125 mol) of benzoyl chloride in 95 cc. of carbon disulfide was cooled to 7° C. in an ice bath and 19 g. (0.14 mol) of anhydrous aluminum chloride added slowly in portions. When about half of the aluminum chloride had been added, a viscous green aluminum chloride complex began to separate. The reaction was warmed to 35° and the remainder of the aluminum chloride was added. At this point the dark green precipitate prevented stirring. (In a subsequent preparation, the AlCl₃ was added at 20–25°. About 10 minutes after the completion of addition of AlCl₃, the evolution of HCl was noted. The reaction mixture was stirred 1 hour at room temperature and 1 hour at reflux.) The carbon disulfide was decanted from the viscous material and discarded. The residue was then decomposed with ice and dilute HCl. The oily layer that separated was extracted with benzene, and the benzene layer washed with dilute HCl, water, and then twice with dilute sodium hydroxide and water. Following drying over sodium sulfate, the solvent was evaporated in vacuo leaving 18.5 g. of a viscous residue. Recrystallization from benzene-hexane gave 4-acetamino-2-methoxybenzophenone, melting point 142–143°.

The benzene-hexane mother liquors from the above crystallizations were concentrated to dryness and the residue crystallized from aqueous ethanol to give 2-acetamino-4-methoxy-benzophenone, melting point 118–119.5°.

EXAMPLE 2

6.5 g. of 2-acetamino-4-methoxybenzophenone were hydrolyzed by refluxing for 3 hours with 200 cc. of ethanol and 100 cc. of 6 N HCl. The mixture was then concentrated to dryness in vacuo, the residue suspended in 50 cc. of water and 200 cc. of ether and made slightly alkaline with sodium hydroxide. The reaction was then cooled to 8–10° C. and 2.3 cc. of bromoacetyl bromide added slowly while keeping slightly alkaline by the addition of 1 N NaOH. The organic layer was then separated, diluted with benzene and dried over sodium sulfate. After evaporation of the solvent in vacuo, the residue was crystallized from benzene-hexane to give 2-bromoacetamino-4-methoxybenzophenone; melting point 106–107.5°.

EXAMPLE 3

A solution of 3.5 g. (15.4 mmols) of 2-amino-4-methoxybenzophenone and 3.2 g. (22 mmols) of glycine ethyl ester hydrochloride in 75 cc. of dry pyridine was refluxed for 1 hour. After distilling off 25 cc. of pyridine, an additional 3.2 g. of glycine ethyl ester hydrochloride was added and the reaction refluxed for a total of 15 hours. Solvent was removed by distillation in vacuo and the residue was partitioned between ether and water. The ether layer was dried and taken to dryness in vacuo. The residue was crystallized from dilute acetonitrile, filtered, and the filtrate was then concentrated in vacuo to dryness. This was crystallized from benzene-hexane and recrystallized from acetone-hexane to give 8-methoxy-5-phenyl-3H-1,4-benzodiazepin-2(1H)-one, melting point 190–191.5°.

EXAMPLE 4

A solution of 5.6 g. of 2-bromoacetamino-4-methoxyacetophenone in 250 cc. of 20% (w./v.) ammonia in methanol was kept overnight at room temperature. After removal of solvent in vacuo, the residue was partitioned between benzene and water. The benzene layer was dried over sodium sulfate and evaporated to dryness in vacuo. The residue crystallized from benzene-hexane to give a product which on crystallization from acetone-hexane gave 8-methoxy-5-phenyl-3H-1,4-benzodiazepin-2(1H)-one, melting point 190–191.5°. The infrared spectrum was identical with that of material prepared by the glycine ester method in Example 3.

EXAMPLE 5

A solution of 5.2 g. of 2-acetamino-4-methoxybenzophenone in 100 cc. of acetic acid was warmed to 50–55° and 3.1 g. of bromine in 25 cc. of acetic acid was added slowly. The bromine decolorized rapidly. After all the bromine had been added, the reaction was kept at 50–55° for 1 hour. Solvent was then removed by distillation in vacuo and the crystalline residue recrystallized from dilute ethanol yielding 2-acetamino-5-bromo-4-methoxybenzophenone, melting point 144–146°.

EXAMPLE 6

5.5 g. of 2-acetamino-5-bromo-4-methoxybenzophenone was hydrolyzed by refluxing for 3 hours in 250 cc. of ethanol and 250 cc. of 6 N HCl. The reaction mixture was concentrated to dryness in vacuo, the residue slurried with water and made alkaline with ammonia and then extracted with benzene. After drying over sodium sulfate, the solvent was removed by distillation in vacuo. Crystallization from benzene-hexane gave 2-amino-5-bromo-4-methoxybenzophenone, M.P. 150–151.5°.

EXAMPLE 7

To a solution of 3.8 g. of 2-amino-5-bromo-4-methoxybenzophenone in 150 cc. of ether, 40 cc. of 1 N NaOH and 3.5 g. of bromoacetyl bromide were added while stirring. The yellow color of the ether layer disappeared almost immediately on mixing. After ¾ hour the organic layer was separated, washed with water and dried over sodium sulfate. The residue obtained after evaporation of solvent was crystallized from benzene-hexane giving 2-bromoacetamido-5-bromo-4-methoxy-benzophenone, which after recrystallization had a melting point of 144–145°.

EXAMPLE 8

A suspension of 3.7 g. of 5-bromo-2-bromoacetamido-4-methoxybenzophenone in 200 cc. of 20 percent (w./v.) ammonia in methanol was stirred for 24 hours at room temperature. The insoluble material was filtered off and the filtrate concentrated to dryness in vacuo. The residue was recrystallized from dilute ethanol to give 7-bromo-8-methoxy-5-phenyl-3H-1,4-benzodiazepin-2(1H)-one which after recrystallization from benzene-hexane was found to have a melting point of 260.5–261.5°.

EXAMPLE 9

A suspension of 3.7 g. of 5-bromo-2-bromoacetamido-4-methoxybenzophenone in 200 cc. of 20% (w./v.) ammonia in methanol was stirred for 24 hours at room temperature. The insoluble material was filtered off and recrystallized several times from benzene and methylene chloride-hexane to give 5-bromo-2-glycylamido-4-methoxybenzophenone, which melted at 161–163°, resolidified at 165–168° and then remelted at 248–251°.

EXAMPLE 10

75 mg. of 5-bromo-2-glycylamido-4-methoxybenzophenone was heated in an oil bath at 200° for several minutes. The material melted at about 160° and resolidified at 180°. Crystallization from a mixture of benzene and hexane gave 7-bromo-8-methoxy-5-phenyl-3H-1,4-benzodiazepin-2(1H)-one; melting point 249.5–251.5°.

EXAMPLE 11

A Grignard reagent prepared from 24 g. of bromobenzene and 3.6 g. of magnesium in 200 cc. of ether was added slowly during 1¼ hours to a solution of 27.1 g. of 2-methyl-6-methoxy-3,1-benzoxazin-4-one dissolved in 375 cc. of dry benzene and 125 cc. of ether at 0–5°. After all the Grignard reagent had been added, the reaction was stirred for ½ hour at 0–5° and then allowed to come to room temperature. It was then cooled in an ice bath and decomposed with 400 cc. of 2 N HCl. The organic layer was then separated and concentrated to dryness in vacuo. The residue was dissolved in 375 cc. of ethanol and 125 cc. of concentrated hydrochloric acid and refluxed for 2 hours. After removal of solvent by distillation in vacuo, the residue was stirred with dilute sodium hydroxide and extracted with benzene. The organic layer was then washed with water, dried over sodium sulfate and then concentrated to dryness in vacuo leaving 20.6 g. of a yellow brown oil. The residue was dissolved in 160 cc. of benzene and 370 cc. of hexane and passed through a column of 250 g. of Woelm alumina grade I neutral. Elution with 1:2 and 2:1 benzene-hexane followed by benzene and crystallization from hexane gave 2-amino-5-methoxybenzophenone, melting point 50–52°.

EXAMPLE 12

A solution of 3.2 g. of 2-amino-5-methoxybenzophenone and 3.0 g. of glycine ethyl ester hydrochloride in 50 cc. of pyridine was refluxed for 1 hour. After distilling off 10 cc. of pyridine, an additional 3.0 g. of glycine ethyl ester hydrochloride and 10 cc. of pyridine was added and refluxed for 16 hours. After concentrating to dryness in vacuo, the residue was partitioned between benzene and water. The benzene layer was dried and evaporated to dryness in vacuo leaving a dark residue. Crystallization from benzene-hexane and recrystallization from benzenehexane give 7-methoxy-5-phenyl-3H-1,4-benzodiazepin-2(1H)-one, melting at 217–218°.

EXAMPLE 13

5.4 g. of 2-amino-5-methoxybenzophenone in 100 cc. of 48% hydrobromic acid was heated to reflux for 8 hours. During concentration to dryness in vacuo, a crystalline material separated. The residue was dissolved in about 100 cc. of water and carefully neutralized with sodium bicarbonate. The yellow crystalline product was filtered off and recrystallized from benzene-hexane, yielding 2-amino-5-hydroxybenzophenone, melting point 127–128°.

EXAMPLE 14

A solution of 4.0 g. of 2-amino-5-hydroxybenzophenone and 4.0 g. of glycine ethyl ester hydrochloride in 50 cc. of pyridine was heated to reflux for 1 hour. About 10 cc. of pyridine was then distilled off and an additional 4.0 g. of glycine ethyl ester hydrochloride and 10 cc. of pyridine added. Reflux was continued for a total of 10 hours. Solvent was distilled off in vacuo and the residue partitioned between benzene and water. A tan solid, insoluble in both liquid phases, was filtered off and recrystallized from acetonitrile, yielding 7-hydroxy-5-phenyl-3H-1,4-benzodiazepin - 2(1H) - one. Additional 7-hydroxy-5-phenyl-3H-1,4-benzodiazepin-2(1H) - one was obtained on neutralizing the aqueous layer with sodium bicarbonate. The product melted at 289–291°.

EXAMPLE 15

A Grignard reagent prepared from 10.3 g. of o-bromanisole and 1.3 g. of magnesium in 100 cc. of ether was added slowly to an ice cold solution of 9.8 g. of 6-chloro-2-methyl-3,1-4H-benzoxazine-4-one in 150 cc. of benzene and 50 cc. of ether. A yellow precipitate formed. The reaction mixture was stirred for 1 hour in an ice bath and for 1 hour at room temperature. It was then chilled in an ice-salt bath and decomposed by the careful addition of 100 cc. of cold 2 N hydrochloric acid. The mother liquor was taken to dryness in vacuo and the residue crystallized from hexane to give 2-acetamino-5-chloro-2'-methoxybenzophenone, which after recrystallization from hexane was found to melt at 124–126°.

EXAMPLE 16

A solution of 3.9 g. of 2-acetamino-5-chloro-2'-methoxybenzophenone in 100 cc. of ethanol and 50 cc. of 6 N hydrochloric acid was refluxed for 2½ hours. Solvent was distilled off in vacuo and the residue stirred with dilute sodium hydroxide and benzene. The benzene layer was separated, dried over sodium sulfate and concentrated to dryness leaving a residual yellow oil, crude 2-amino-5-chloro-2'-methoxybenzophenone. No attempt was made to crystallize the amine but it was then dissolved in 150 cc. of ether, chilled in an ice bath and 20 cc. of water added. Then 3.1 g. of bromoacetyl bromide was slowly added with the simultaneous addition of 1 N sodium hydroxide to keep the reaction mixture slightly alkaline. The organic layer was separated, washed with water and dried over sodium sulfate. After distillation of solvent, a yellow oil remained which crystallized on standing. Recrystallization from acetonitrile afforded 2-bromoacetamino - 5 - chloro - 2' - methoxybenzophenone, melting point 129–130.5°.

EXAMPLE 17

A solution of 2.4 g. of 2-bromoacetamino-5-chloro-2'-methoxybenzophenone in 100 cc. of 20% (w./v.) ammonia in methanol was kept at room temperature for 17 hours. Methanol and ammonia were distilled off in vacuo and the residue dissolved in benzene and water. The organic layer was dried over sodium sulfate and the solvent then evaporated in vacuo. The residue was crystallized from a mixture of benzene and hexene to give 7-chloro - 5 - (2 - methoxyphenyl)-3H-1,4-benzodiazepin-2(1H)-one, which after drying at 100° in vacuo melted at 205.5–206.5°.

EXAMPLE 18

To a suspension of 6.0 g. of 7-chloro-5-(2-methoxyphenyl)-3H-1,4-benzodiazepin-2(1H)-one in 100 cc. of dry toluene at 40° C., 1.1 g. of sodium methoxide was added. The lemon colored solution that formed was heated to 100°, allowed to cool and then about 20 cc. slowly distilled off to remove methanol. The solution was then cooled to 50° and 1.9 cc. of dimethyl sulfate added. After refluxing for 1 hour, the cool toluene solution was washed with water and dilute sodium hydroxide, then dried over sodium sulfate. Toluene was distilled off in vacuo and the residue crystallized from a mixture of ethyl acetate and hexane. Unreacted starting material was recovered. The filtrate was concentrated to dryness in vacuo and dissolved in a mixture of 25 cc. of benzene and 50 cc. of hexane and adsorbed on a column containing 50 g. of alumina, neutral grade I, and then eluted first with mixtures of benzene and hexane, and then with benzene alone. From the eluates 7-chloro-5-(2-methoxyphenyl)-1-methyl - 3H - 1,4-benzodiazepin-2(1H)-one was obtained. Recrystallization from benzene-hexane gave a pure product melting at 161–162°.

EXAMPLE 19

11.2 g. of 2-acetamino-5-chloro-2'-methoxybenzophenone was refluxed for 8 hours with 200 cc. of 48% hydrobromic acid. After concentrating to dryness in vacuo, the dark residue was treated with dilute ammonia and extracted with benzene. The benzene layer was dried over sodium sulfate and the solvent evaporated in vacuo. The crude 2-amino-5-chloro-2'-hydroxybenzophenone thus obtained was dissolved in 250 cc. of ether, cooled to 5° in an ice bath and 12.3 g. of bromoacetyl bromide added slowly with the simultaneous addition of 1 N sodium hydroxide to keep the reaction slightly alkaline. When the reaction was complete, acetic acid was added to the neutral point. The organic layer was separated, washed with water and dried over sodium sulfate. Crude 2-bromoacetamino-5-chloro-2'-hydroxybenzophenone was obtained by evaporation of the solvent. It was dissolved in 250 cc. of 20% (w./v.) ammonia and methanol and stirred for 17 hours at room temperature. Crystalline 7-chloro-5-(2-hydroxyphenyl)-3H-1,4-benzodiazepin-2(1H)-one began to separate within 1 hour. It was filtered off and recrystallized from acetonitrile, melting point 286-288°.

EXAMPLE 20

A Grignard reagent prepared by the reaction of 30.8 g. of m-bromanisole and 3.9 g. of magnesium in 400 cc. of ether was slowly added to an ice cold suspension of 29.3 g. of 6-chloro-2-methyl-4H-3,1-benzoxazine-4-one in 450 cc. of benzene and 150 cc. of ether. After all of the Grignard reagent was added, the reaction mixture was stirred for 1 hour in the ice bath, then 1 hour at room temperature. It was then chilled in a salt-ice bath and decomposed by the addition of 250 cc. of 2 N hydrochloric acid. The organic layer was separated, washed with water, dilute sodium hydroxide, and water, then dried over sodium sulfate. After evaporation of solvent in vacuo, a residual dark yellow oil of crude 2-acetamino-5-chloro-3'-methoxybenzophenone was obtained.

A solution of 15 g. of crude 2-acetamino-5-chloro-3'-methoxybenzophenone in 300 cc. of ethanol and 150 cc. of 6 N hydrochloric acid was heated to reflux for 3 hours and then concentrated to dryness in vacuo. No attempt was made to isolate 2-amino-5-chloro-3'-methoxybenzophenone but the solid residue was suspended in 75 cc. of water and 400 cc. of ether, then made slightly alkaline by the addition of 40% sodium hydroxide. The mixture was then cooled in an ice bath and 10 g. of bromoacetyl bromide was added slowly with the simultaneous addition of 1 N sodium hydroxide to keep the reaction slightly alkaline. The organic layer was then separated, diluted with benzene, washed with water and dried over sodium sulfate. The residue obtained after evaporation of the solvent in vacuo was crystallized from hexane to give 2-bromoacetamino - 5 - chloro-3′-methoxybenzophenone, which after recrystallization from hexane was found to have a melting point of 97–98.5°.

EXAMPLE 21

9.5 g. of 2 - bromoacetamino - 5-chloro-3′-methoxybenzophenone was dissolved in 250 cc. of 20% (w./v.) ammonia in methanol and kept at room temperature for 17 hours. Solvent was then evaporated in vacuo and the residue then shaken with benzene and water. The organic layer was dried over sodium sulfate and the solvent then distilled off. The residue was crystallized from acetone-hexane to yield 7-chloro-5-(3-methoxyphenyl)-3H-1,4-benzodiazepin-2(1H)-one, melting point 219–221°.

EXAMPLE 22

A solution of 4.05 g. of 2-amino-5-chloro-4′-methoxybenzophenone in 200 cc. of ether was stirred with 50 cc. of water. The mixture was then cooled in an ice bath and 3.14 g. of bromo acetyl bromide was slowly added with the simultaneous addition of 1 N sodium hydroxide to keep the reaction slightly alkaline. The organic layer was diluted with benzene, separated and washed with water and dried over sodium sulfate. The residue after evaporation of solvent in vacuo, was crystallized from benzene-hexane to give 2-bromoacetamino-5-chloro-4′-methoxybenzophenone, melting point 116–118°.

EXAMPLE 23

A suspension of 3.9 g. of 2-bromoacetamino-5-chloro-4′-methoxybenzophenone in 125 cc. of 20% (w./v.) ammonia in methanol was stirred for 19 hours at room temperature. A small amount of insoluble material was filtered off and the filtrate evaporated to dryness in vacuo. The residue was shaken with water and benzene, and the organic layer so obtained dried over sodium sulfate and concentrated to dryness in vacuo. The residue was crystallized from acetone-hexane to give 7-chloro-5-(4-methoxyphenyl) - 3H - 1,4-benzodiazepin-2(1H)-one, melting point 212–214°. Additional amounts of this product were obtained from the mother liquor.

We claim:
1. A compound of the formula

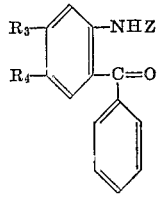

wherein Z is lower alkanoyl, $R_3$ is hydroxy or lower-alkoxy, and $R_4$ is hydrogen or halogen.

2. The compound of claim 1 wherein said compound is 2-acetamino-5-bromo-4-methoxybenzophenone.

3. A compound of the formula

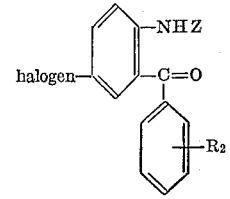

wherein Z is lower alkanoyl and $R_2$ is chosen from the group consisting of hydroxy and lower alkoxy.

4. The compound of claim 3 wherein said compound is 2-acetamino-5-chloro-3′-methoxybenzophenone.

5. A compound of the formula

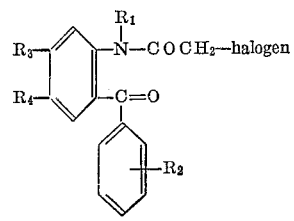

wherein $R_1$ is chosen from the group consisting of hydrogen and lower alkyl; $R_2$ is chosen from the group consisting of hydrogen, halogen, lower alkoxy and hydroxy, $R_3$ is chosen from the group consisting of hydrogen, lower alkoxy and hydroxy; $R_4$ is chosen from the group consisting of hydrogen, halogen, lower alkoxy and hydroxy; and at least one of $R_2$, $R_3$, and $R_4$ is chosen from the group consisting of hydroxy and lower alkoxy.

6. The compound of claim 5 wherein said compound is 2-bromo acetamino-5-chloro-3′-methoxybenzophenone.

7. The compound of claim 5 wherein said compound is 2-bromoacetamino-5-chloro-4′-methoxybenzophenone.

8. The compound of claim 5 wherein said compound is 5-bromo-2-bromoacetamido-4-methoxybenzophenone.

References Cited

UNITED STATES PATENTS 3,051,701   8/1962   Reeder et al. _____ 260—239

HENRY R. JILES, Primary Examiner

H. I. MOATZ, Assistant Examiner